Oct. 29, 1957 A. D. STORCK ET AL 2,811,600
BRAKE FLUID-LEVEL WARNING DEVICE FOR A MASTER CYLINDER
Filed Oct. 10, 1955 2 Sheets-Sheet 2
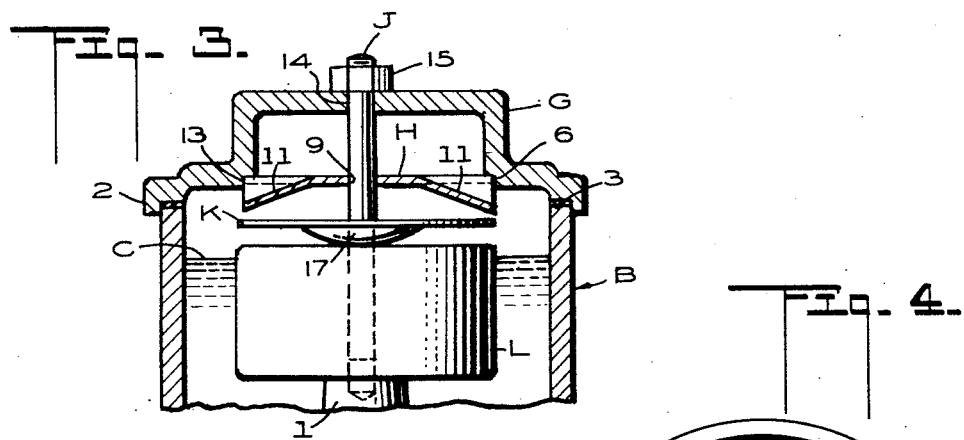
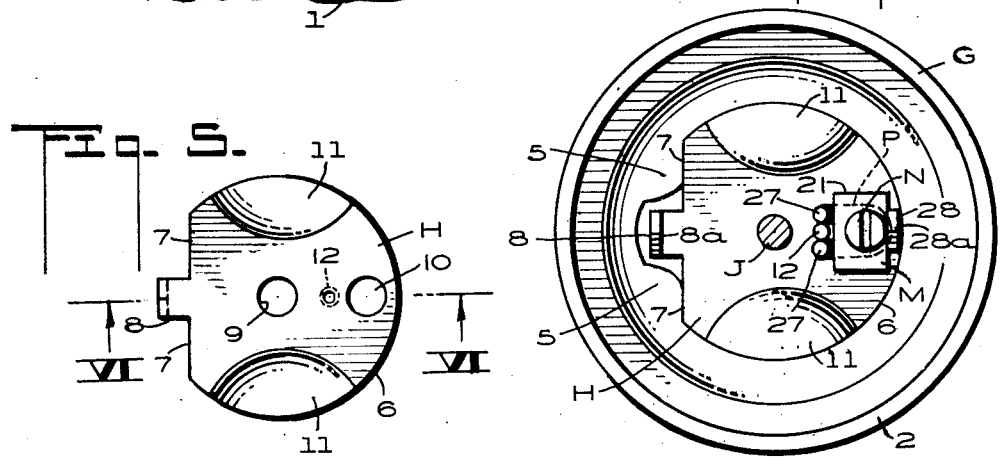
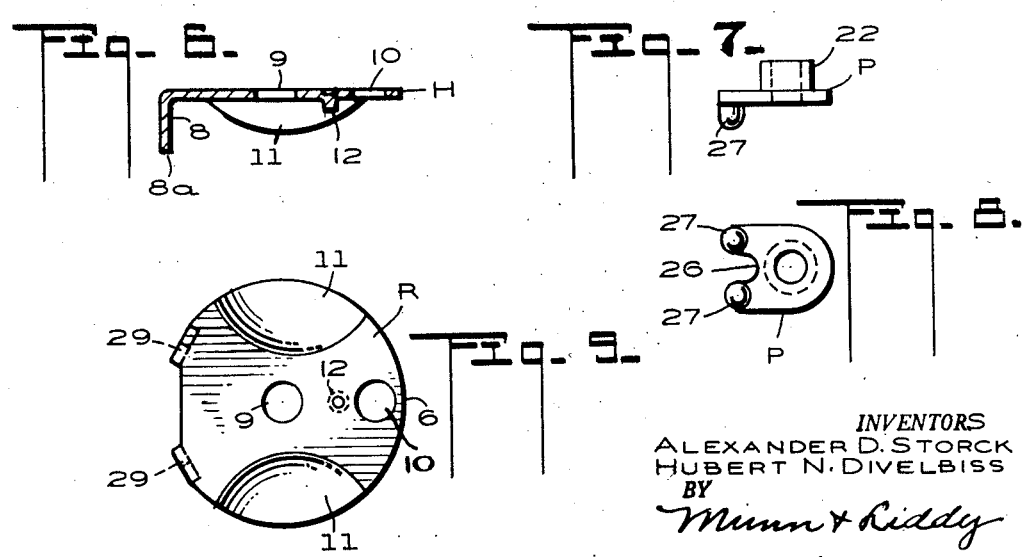
INVENTORS
ALEXANDER D. STORCK
HUBERT N. DIVELBISS
BY
Munn & Liddy
ATTORNEYS United States Patent Office 2,811,600
Patented Oct. 29, 1957

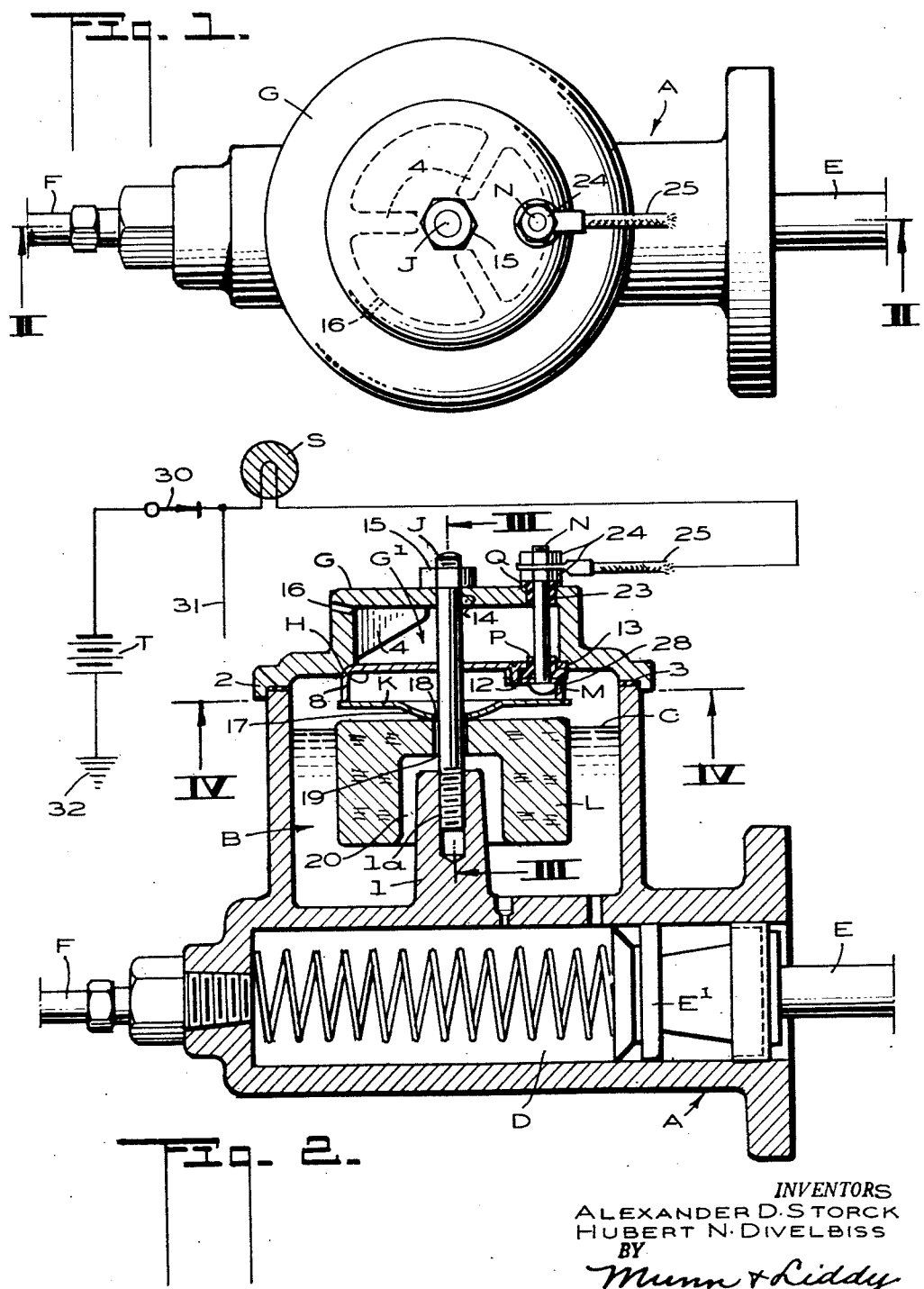

2,811,600

BRAKE FLUID-LEVEL WARNING DEVICE FOR A MASTER CYLINDER

Alexander D. Storck and Hubert N. Divelbiss, Napa, Calif.

Application October 10, 1955, Serial No. 539,349

3 Claims. (Cl. 200—84)

The present invention relates to improvements in a fluid-level warning device for a master cylinder of a hydraulic brake system. It consists of the combinations, constructions, and arrangement of parts, as hereinafter described and claimed.

An object of our invention is to provide a float-controlled switch for a master cylinder, and an electrical circuit connected therewith, which will illuminate a light as soon as the ignition switch is turned on. As long as the light continues to glow, during operation of the vehicle, the driver will be assured of the fact that a safe amount of braking fluid is contained in the master cylinder. However, in the event that the fluid level should descend to a point slightly below a predetermined safe level, the float-controlled switch will open, resulting in putting out the light. Thus the absence of the burning light will indicate several possibilities to the driver: (1) the reservoir of the master cylinder requires refilling; (2) the light itself has burned out; (3) the electrical circuit no longer functions, for one reason or another, and should be checked; or (4) the brakes themselves or the lines leading thereto are leaking fluid.

In our copending application on a fluid-level warning device for a master cylinder, Serial No. 456,355, filed September 16, 1954, we show a simple automatic switch mechanism that is used in place of the conventional filler plug in the master cylinder of motor vehicles. An improved filler plug carries the float switch mechanism and may be substituted for the standard filler plug used in the master cylinder.

Our present invention pertains to a simple automatic float-controlled switch mechanism that is mounted in the cover for the brake-fluid reservoir. The standard cover for the reservoir is removed, and our cover is substituted and carries the switch mechanism. The switch when closed, connects the small green indicator light with a source of current and the glowing of the light shows the driver that there is brake fluid in the master cylinder reservoir. The indicator light is preferably placed on the dash board of the car, not shown.

The switch is made sensitive to changes in fluid level so that a drop of the level to say two-thirds of the reservoir capacity, will cause the small green light to flicker as the fluid level fluctuates slightly as the vehicle moves over the ground. Should the fluid level lower still farther, say to the halfway mark, the automatic switch will stay open and the green light will go out.

The flicker of the green light informs the driver that the brake fluid has dropped below the full mark and cautions him to add fluid soon. The failure of the green light to burn should be taken as a warning signal and brake fluid should be added. The main function of the device is to give visible assurance against accidents caused by faulty brakes due to lack of sufficient fluid in the master brake cylinder. Its use on motor vehicles will contribute a great deal toward lowering the high death rate and costly loss of property through highway accidents.

Other objects and advantages will appear as the specification continues. The novel features will be set forth in the claims hereunto appended.

Drawings

For a better understanding of the invention, reference is made to the accompanying drawings, forming a part of this application, in which:

Figure 1 is a top plan view of a master brake cylinder with our reservoir cover and automatic switch mechanism substituted for the standard cover;

Figure 2 is a longitudinal and vertical section through the device and is taken along the line II—II of Figure 1;

Figure 3 is a vertical transverse section through the brake fluid reservoir and the cover therefor, and is taken along the line III—III of Figure 2;

Figure 4 is a plan view of the underside of the cover when looking in the direction of the arrows IV—IV of Figure 2;

Figure 5 is a top plan view of a baffle plate and electric terminal holder used to close the dome-shaped head formed in the top of the cover;

Figure 6 is a longitudinal section taken along the line VI—VI of Figure 5;

Figure 7 is a side elevation of an insulating washer used in the device;

Figure 8 is a bottom plan view of Figure 7; and

Figure 9 is a plan view of a modified form of baffle plate that is provided with two depending terminals rather than the one terminal shown in Figure 5.

Detailed description

In carrying out our invention we make use of a conventional master cylinder indicated generally at A in Figure 2, and adapted to be used in connection with a hydraulic brake system of a vehicle. This master cylinder has a reservoir B for holding brake fluid C. The fluid in the reservoir enters a work cylinder indicated generally at D through openings in the bottom of the reservoir in a well known manner. This cylinder has a reciprocable piston rod E and a piston $E^1$ for moving the brake fluid into a feed line F when a brake pedal, not shown, is actuated. The reservoir B has an upstanding and centrally disposed projection 1 that is provided with a central threaded bore 1a.

Normally, the open top of the reservoir B is closed by a standard cover that is held in place by a cap screw which passes through an opening in the cover and is threaded into the central bore 1a. In place of the usual cover for the reservoir, we substitute a modified cover G of the type shown in Figures 1 and 2. This cover has a flange 2 that fits downward around the outer surface of the reservoir B. A gasket 3 is placed between the undersurface of the cover and the rim of the reservoir. Figure 4 illustrates how the cover G is made circular and it is provided with a dome-shaped top for forming a vent chamber $G^1$. The center wall of the chamber is reinforced by radially extending ribs 4. Figure 4 shows the cover as having inwardly extending projections 5 for a purpose now to be described.

In Figures 5 and 6 we show a baffle plate H, and this plate has a circular periphery 6 (see Figure 5) that is provided with cut-away portions 7. A tongue 8 is integral with the baffle plate and extends between the two cut-away portions 7 and is provided with a V-shaped end 8a.

Reference to Figures 5 and 6 further shows the baffle plate provided with a central opening 9 and a second opening 10, and the purpose of these openings will be described hereinafter. The baffle plate also has diametrically opposed baffle portions 11 that extend downwardly at an angle, as clearly shown in Figures 1 and 2. A downwardly extending post or boss 12 is integral with the baffle plate and is disposed between the openings 9 and 10.

Figures 2, 3 and 4, show the baffle plate H as closing the bottom of the vent chamber G¹ with the exception of the passages provided by the baffle portions 11. The cover G is provided with an annular recess for receiving the periphery 6 of the baffle plate. The cut-away portions 7 of the plate will bear against the projections 5 of the cover and in this way the baffle plate is positioned with respect to the cover and is held against rotation in the cover.

We show a stud J extending through an opening 14 in the cover (see Figures 2 and 3), and the lower threaded end of the stud enters the central threaded bore 1a. A nut 15 is mounted upon the outer threaded end of the stud and holds the cover G on the rim of the reservoir. Figure 4 shows the stud J extending through the central opening 9 in the baffle plate H. A vent opening 16 extends through the dome-shaped top of the cover G and communicates with the vent chamber G¹ (see Figure 2).

A crowned contact member K has a dish-shaped central depression 17 provided with a central opening 18 and the opening slidably receives the stud J. The crowned contact member K rides on the top of a float L of the shape shown in Figure 2 and this float has a central opening 19 slidably receiving the stud J. It will also be seen from Figure 2 that the undersurface of the float is provided with a recess 20 for receiving the top of the projection 1. The tongue 8 on the baffle plate H extends downwardly and when the float is in its uppermost position, it will lift the crowned contact member K into electrical contact with the pointed end 8a of the tongue. This constitutes one terminal of the float-controlled switch. The crowned contact member K is guided in its movement by the stud J being slidably received in the opening 18. The depression 17 permits the member K to rock freely on top of the float within predetermined limits.

The other terminal M of the switch is shown in Figures 2 and 4, and it will be seen from these figures that this terminal M has a rectangular body 21 provided with a central opening for receiving a bolt N. The terminal M, as well as the bolt N, are insulated from the baffle plate by an insulating washer indicated generally at P in Figures 7 and 8. This washer has an integral bushing 22 that is designed to enter the opening 10 in the baffle plate H. The bolt N passes through the bushing and is thus insulated from the baffle plate. The cover G has an opening 23 for receiving a flanged insulator Q, and the bolt N passes through this insulator. A pair of nuts 24 hold the bolt N in place and clamp a wire 25 therebetween.

Coming back to the insulated washer P, we have provided it with a recess 26 (see Figure 8) and two projections 27, one being disposed on each side of the recess. Figure 4 shows the rectangular base 21 of the terminal M bearing against the projections 27 so that the terminal is prevented from rotating with respect to the insulating washer P. The same figure also shows the projection 12 on the baffle plate H extending into the recess 26 and holding the insulating washer P from rotating with respect to the baffle plate. The bolt N holds the terminal M in a position where its tongue 28 will be disposed diametrically opposite the tongue 8 (see Figure 4). The crowned contact member K is designed to contact the tongue 28 in the same manner as it contacts the tongue 8. In fact, the tongue 28 has a pointed end 28a so that a sharp edge will contact with the crowned contact member K.

In Figure 9 we show a slightly modified form of a baffle plate R. This plate is provided with two contact points 29, in place of the one shown in Figure 5. In all other respects this baffle plate is the same as the baffle plate K, and no further description need be given. In certain instances two contact points 29 might give a greater advantage to the operation of the device than a single contact point 8. This is especially true where excessive rocking of an automobile, or other vehicle in which the master cylinder is disposed, takes place. The terminal M could have two contacts 28, not shown, in place of the single contact point, if desired.

In Figure 2 we show a simple wiring diagram where the wire 25 is connected to a green light S that is preferably placed on the dashboard, not shown, of the vehicle. The ignition switch 30, when closed, places the green light S in electrical connection with a battery T. When, therefore, the reservoir B is filled with brake fluid, the float L will be in raised position and will close an electric circuit to the green light S and cause it to be illuminated. The closing of the ignition switch 30 will also close the ignition circuit for the engine, not shown, and a part of this circuit includes the wire 31.

*Operation*

If the reservoir B has a sufficient quantity of brake fluid therein, the light S will be lighted as soon as the ignition switch is closed. This is due to the fact that the crowned contact disc K will bridge the terminals 8 and 28 and therefore an electric circuit will be closed from the battery T, through the ignition switch 30, and the light S, and then to the bolt N which is insulated from the cover G by the washers P and Q. The terminal M is in electric contact with the bolt N, and therefore the current will flow through this contact, and then through the disc K to the contact 8. The latter contact 8 is electrically connected to the cover G and therefore the current will flow to ground, and from ground 32, back to the battery T, to complete the circuit.

Should the level of the brake fluid C drop to a predetermined point, the float L will cease to hold the contact disc or washer K, firmly against the two contacts 8 and 28. The disc K, and terminals 8 and 28, constitute an automatic switch in series with the green light S. When the automatic switch opens and closes, caused by the lower level of the fluid and by its surging in the reservoir B, the green light S will flicker and will warn the driver to replenish the master cylinder A with brake fluid. When the level of the fluid C, drops still lower, the light S will go out. This means that brake fluid must be added at once for safety sake.

The baffle plate prevents the brake fluid C from being pumped out the breather opening 16 during the actuation of the brake. The baffle portions 11 on the plate H prevent too much brake fluid from surging into the vent chamber G¹, while permitting air to pass into and out of the chamber. The capacity of the vent chamber G¹ is large enough to receive what little brake fluid might pass the baffles 11 and still prevent this fluid from passing out through the vent 16.

It is obvious that the automatic float switch mechanism could be used in a brake fluid reservoir that is mounted at a higher point than the master brake cylinder. The elevated reservoir would be in communication with the master brake cylinder to furnish liquid thereto as needed. The purpose of the elevated reservoir is to give ready access to it for checking and adding more brake fluid as needed.

We claim:

1. The combination with a master brake cylinder having a reservoir for containing a brake fluid: of a cover closing the reservoir and having a cavity therein opening toward the reservoir and constituting a vent chamber; the cover having a bleed opening placing the vent chamber in communication with the atmosphere; a baffle plate closing the greater part of the bottom of the vent chamber and having baffle portions for permitting the air to pulsate between the vent chamber and the reservoir, but preventing passage of sufficient brake fluid into the vent chamber to cause some to pass through the bleed opening; a stud for securing the cover to the reservoir, said stud extending through the reservoir and through the baffle plate and constituting a guide; a float slidable on the stud and mounted in the reservoir to float on the brake fluid; said baffle plate having a depending terminal; a second terminal insulated from the baffle plate and electrically connected to a signal light; and a rockable switch-closing member mounted on the float and guided by the stud; said switch-closing member contacting both terminals for connecting the signal light to a source of current when the float is held in raised position by the brake fluid; the reservoir having a projection provided with a threaded bore for receiving the lower end of the stud.

2. The combination with a master brake cylinder having a reservoir for containing a brake fluid: of a cover closing the reservoir and having a cavity therein opening toward the reservoir and constituting a vent chamber; the cover having a bleed opening placing the vent chamber in communication with the atmosphere; a baffle plate closing the greater part of the bottom of the vent chamber and having baffle portions for permitting the air to pulsate between the vent chamber and the reservoir, but preventing passage of sufficient brake fluid into the vent chamber to cause some to pass through the bleed opening; a stud for securing the cover to the reservoir; said stud extending through the reservoir and through the baffle plate and constituting a guide; a float slidable on the stud and mounted in the reservoir to float on the brake fluid; said baffle plate having a depending terminal; a second terminal insulated from the baffle plate and electrically connected to a signal light; a rockable switch-closing member mounted on the float and guided by the stud; said switch-closing member contacting both terminals for connecting the signal light to a source of current when the float is held in raised position by the brake fluid; the reservoir having an upwardly-extending projection provided with a threaded bore for receiving the lower end of the stud; and said float being provided with a recess in its undersurface that receives the upper portion of the projection.

3. The combination with a master brake cylinder having a reservoir for holding a brake fluid: of a cover closing the top of the reservoir and having a cavity therein opening toward the reservoir and constituting a vent chamber; the cover having a bleed opening placing the vent chamber in communication with the atmosphere; a baffle plate closing the greater part of the bottom of the vent chamber and having baffle portions for permitting air to pass from the reservoir into the vent chamber; a stud for securing the cover to the reservoir and extending centrally through the vent chamber, baffle plate and reservoir; an integral terminal carried by the baffle plate and being electrically grounded to the master brake cylinder; a bolt passed through the baffle plate and cover for holding the baffle plate in position; said bolt being insulated from both the baffle plate and the cover; a second terminal carried by the bolt and insulated from the baffle plate and cover; said second terminal being in electrical connection with a signal light; a rockable switch-closing member carried by the float and guided by the stud for electrically connecting the two terminals together when the float is in raised position and for connecting the light to a source of current; an insulating washer carried by the bolt and separating the second terminal from the baffle plate; said washer having a recess placed between two projections; said baffle plate having a projection received in the recess for preventing rotation of the washer on the bolt; and said second terminal having an edge bearing against the two projections of the washer for preventing rotation of the second terminal about the bolt.

References Cited in the file of this patent

UNITED STATES PATENTS

| | | |
|---|---|---|
| 1,768,446 | Gron | June 24, 1930 |
| 2,663,772 | Cochrane | Dec. 22, 1953 |
| 2,672,535 | MacDonald | Mar. 16, 1954 |